3,043,823
PROCESS UTILIZING CARBON DISULFIDE IN AQUEOUS EMULSION POLYMERIZATION OF FLUORINATED MONOOLEFINS
Russell M. Mantell, Princeton, N.J., and John M. Hoyt, Cincinnati, Ohio, assignors to Minnesota Mining and Manufacturing Company, St. Paul, Minn., a corporation of Delaware
No Drawing. Filed Aug. 18, 1958, Ser. No. 755,417
7 Claims. (Cl. 260—92.1)

This invention relates to a process for the polymerization of mono-olefins in aqueous media. In one aspect it relates to the emulsion polymerization of fluorine-containing olefins such as chlorotrifluoroethylene using a fluorocarbon dispersing agent.

The advantages of polymerizing mono-olefins in aqueous dispersions are well known. However, until recently, it has not been possible to polymerize mono-olefins, particularly halogenated mono-olefins such as tetrafluoroethylene and chlorotrifluoroethylene, in fine dispersions, due to the fact that satisfactory dispersing agents are unknown.

It has recently been suggested that stable aqueous colloidal dispersions of polymerized halogenated mono-olefins could be prepared by polymerizing the fluorinated monomer in the presence of aliphatic fluorocarbon acids and salts. However, it was desirable to find a method for increasing the product yield.

It has now been found that the addition of carbon disulfide to the polymerization system increases the rate of reaction as well as the overall product yield. This novel process is especially noteworthy because, contrary to expectations, the addition of carbon disulfide does not inhibit the polymerization, as is the rule with sulfides, mercaptans, ethers, alcohols, etc.

It is therefore an object of this invention to provide a process for the polymerization of mono-olefins in aqueous media to produce a polymeric product in high yields.

It is a further object of this invention to provide an improved process for polymerizing fluorinated olefins, in an aqueous medium, such process providing polymer in high yields.

Still another object of this invention is to provide an improved process for polymerizing fluorinated olefins in aqueous medium, such process having a high reaction rate.

It is a further object of this invention to provide a fluid stable latex of chlorotrifluoroethylene polymer which can be applied directly for the casting of strong flexible self-supporting films, or for the coating of metal or other surfaces and for the impregnation of fibrous materials.

Other objects and advantages will become apparent from the description and disclosure of the invention.

These and other objects are accomplished by polymerizing a mono-olefin, particularly a halogenated mono-olefin which is at least half fluorinated and which contains from 2 to 5, preferably from 2–3 carbon atoms, in an aqueous medium which contains carbon disulfide and a dispersing agent. When the mono-olefin is fluorinated, the preferred dispersing agents are aliphatic halocarbon acids, particularly aliphatic fluorocarbon acids, such as produced by hydrolyzing a telomer of chlorotrifluoroethylene, or a water-soluble inorganic salt of such an acid, to produce a solid high molecular weight polymerization product in the form of a dispersion.

Acids produced from chlorotrifluoroethylene telomers by hydrolysis may be represented by the generic formula $$Z(CF_2CFCl)_{n-1}CF_2COOH$$

wherein $n$ is an integer from 2 to 16 and wherein Z is a mono-functional radical of the group consisting of a perhalogenated radical having a total atomic weight of not higher than 146.5 and a halogen atom selected from the group consisting of fluorine, chlorine and bromine atoms.

These aliphatic perfluorochloro acids may be prepared by the hydrolysis with fuming sulfuric acid of a bromotrichloromethane telomer of chlorotrifluoroethylene or a sulfuryl chloride telomer of chlorotrifluoroethylene. The preferred telomer acids are those containing from 6 to 12 carbon atoms.

Another suitable perfluorochloro acid may be prepared by the treatment with fuming sulfuric acid of a bromotrichloromethane telomer of chlorotrifluoroethylene. The telomer, having the formula $$CCl_3(CF_2-CFCl)_nBr$$

wherein $n$ is an integer from 2 to 16, preferably from 3–6, may be prepared in a specific example by dissolving 3.5 parts of benzoyl peroxide in 408 parts of bromotrichloromethane and charging this solution to a pressure vessel along with 300 parts of chlorotrifluoroethylene. The system is heated for about four hours at about 100° C. with agitation to produce high yields of relatively low molecular weight polymers having the above formula. These polymers may be distilled to produce individual compounds of the above formula wherein $n$ is a particular integer. The mixed polymer, or any fraction thereof, is treated with fuming sulfuric acid containing less than about 20% excess sulfur trioxide at a temperature between about 125° C. and about 175° C. for a period of time between about 10 hours and 25 hours to produce monocarboxylic acids having an odd number of carbon atoms in the aliphatic chain with the structure $$CCl_3(CF_2-CFCl)_{n-1}CF_2COOH$$

A detailed description of this method of preparing perfluorochloro acids may be found in U.S. Patent No. 2,806,865.

Still another suitable perfluorochloro acid may be prepared by the treatment with fuming sulfuric acid of a sulfuryl chloride telomer of chlorotrifluoroethylene; this telomer having the formula $Cl-(CF_2CFCl)_n-Cl$, wherein $n$ is an integer from 2 to 16, preferably from 3–6, may be prepared in a specific example by dissolving 3.5 parts of benzoyl peroxide in 308 parts of carbon tetrachloride and 135 parts of sulfuryl chloride, adding 116 parts of chlorotrifluoroethylene and heating at about 95° C. for a period of four hours. The telomers may be distilled to individual compounds wherein $n$ is a particular integer. The mixed telomer, or any fraction thereof, is treated with fuming sulfuric acid containing from 0 to 20% excess sulfur trioxide at a temperature between about 140° C. to about 210° C. for a period of time ranging from 5 to 25 hours to produce monocarboxylic acids of the formula $$Cl(CF_2-CFCl)_{n-1}CF_2-COOH$$

A detailed description of this method of producing perfluorochloro acids may be found in U.S. Patent No. 2,806,866.

In addition to the acids, alkali metal, such as sodium, potassium, etc. and amine and ammonium salts of the above acids may also be used.

Other suitable halocarbon acids include polyfluoroalkanoic acids of the formula $H(CF_2)_n-COOH$ and of the formula $F(CF_2)_n-COOH$ and their alkali metal, ammonium, amine or quaternary ammonium salts. Still other fluorochloro acid salts dispersing agents within the scope of this invention may also be prepared by thermal cracking of polychlorotrifluoroethylene, as described in the co-pending application of David B. Brandon, Serial No. 452,704, filed August 27, 1954.

Mono-olefinic compounds which are within the scope of this invention contain from 2 to 5 carbon atoms, preferably 2 to 3 carbon atoms, and include vinyl chloride, ethylene, proplyene, vinyl acetate, etc. The fluorinated mono-olefins which constitute the preferred embodiment of this invention contain from 2 to 5 carbon atoms, preferably 2 to 3 carbon atoms. Those mono-olefins which contain at least 50% of fluorine substitution are particularly preferred. The mono-olefinic monomers within the scope of this invention may be either homopolymerized or copolymerized. Among the specific monomers which may be homopolymerized are tetrafluoroethylene, chlorotrifluoroethylene, and vinylidene fluoride. Those that may be copolymerized in accordance with this invention include the above and additionally dichlorodifluoroethylene (symmetrical and unsymmetrical), perfluoropropene, trichlorofluoroethylene, etc., any of which may be copolymerized with each other or with another halogenated olefin. The invention is particularly useful in the homopolymerization of chlorotrifluoroethylene to produce a high molecular weight plastic with a high no strength temperature, such as 250 and above. This invention is also useful in the copolymerization of chlorotrifluoroethylene and vinylidene fluoride to produce resins and elastomers and in the copolymerization of perfluoropropene and vinylidene fluoride to produce resins and elastomers.

The polymerization of monomers in accordance with this invention requires an aqueous medium, a dispersing agent of the class discussed above, carbon disulfide, and a polymerization initiator, such as a water-soluble inorganic polymerization initiator, e.g. the ammonium and alkali metal persulfates, perborate or percarbonates, or an organic peroxide, such as cumene hydroperoxide. The preferred polymerization initiators or promoters are ammonium persulfate and alkali metal persulfates, particularly sodium or potassium persulfate. However, it is also within the scope of this invention to use ultraviolet light and other free radical formers as the initiator.

When polymerization is carried out at low temperatures, as preferred when homopolymerizing chlorotrifluoroethylene to a resin of high no strength temperature, it may be desirable, though not necessary, to include, in addition to the aforesaid polymerization initiator, a reductant such as ammonium or water-soluble alkali metal salt of a readily oxidizable sulfoxy compound, such as sodium sulfite, sodium bisulfite, sodium thiosulfate and sodium hydrosulfite. In addition, it may also be desirable, though not necessary, when polymerizing at low temperatures, below about 50° C., to include a small amount of a water-soluble salt of a metal capable of change of valence, as, fore example, a silver, copper or ferrous salt, such as ferrous sulfate. The polymerization medium may also include buffers such as borax, disodium phosphate, ammonium carbonate or sodium acetate. It is a particularly preferred embodiment, however, to omit both the reductant and the metal salt, as their use tends to discolor the product.

The polymerization process of this invention is preferably carried out at high pH, such as pH 7–14, preferably at a pH of about 8–11, and at temperatures from about 0 to 100° C. usually about 15–35° C., for solid polymers. The polymerization temperatures can be varied within the above range depending on the molecular weight of the product desired. Pressures used are preferably autogenous and may go as high as 50 atmospheres. With carbon disulfide used as an "activator" the control of pH within the above ranges is essential if the full effect of the carbon disulfide on the yield is to be obtained.

The concentration of mono-olefin in the aqueous dispersion may vary from about 5 to about 50 percent by weight of the water present. The dispersing agent may be present in concentrations from about 0.1% to about 6 percent by weight of the water present. The polymerization initiator or promoter may be present in concentrations from about .001% to about 5%, based on the weight of monomer used. The amount of carbon disulfide used can vary from 1–50 parts by weight of monomer, the preferred range being between about 5 and about 25 parts by weight of monomer. The salt of the variable valence metal is usually present, when used, in an amount to provide from 0.2 to 600 parts per million of ferrous ions based on the weight of the aqueous medium; and the reductant, when used, is usually present in an amount from 1 to 6 parts by weight per 100 parts of total monomer, usually in equal amounts with the promoter.

Polymerization generally takes place over a period of time ranging from 20 minutes to 100 hours and produces high conversions of up to 100% of the monomer feed. When used in accordance with this invention, the presence of carbon disulfide in the polymerization system greatly enhances the overall conversion to the polymeric product.

The dispersions of the present invention may be stored as such or, if desired, the polymer produced may be recovered therefrom by coagulating by rapid cooling or freezing, such as with a Dry Ice-acetone bath, or by coagulating with a strong mineral acid, such as hydrochloric acid or sulfuric acid, or with a salt solution such as sodium or magnesium chloride or aluminum sulfate, and then filtering, washing and drying. By washing with a suitable solvent the carbon disulfide can be removed from the polymer.

Another particular advantage of the high yield product dispersions obtained by the method of this invention is that the latex product may still be used directly as a coating dispersion, since the carbon disulfide volatilizes off at film forming temperatures. Thus the addition of the carbon disulfide does not in any way alter the characteristics of the coating or film. This is particularly advantageous where such coating is subjected to severe conditions of temperature and chemical attack. Applications for such polymers and latices of such polymers, particularly the fluorinated polymers, is well known in the art and need not therefore be further mentioned here.

The following examples are offered to illustrate the invention and are not to be construed necessarily as limiting its scope.

EXAMPLE 1

Emulsion polymerization of trifluorochloroethylene was conducted in sealed 250 ml. glass polymerization tubes at 25° C. for 20 hours with shaking, using the following emulsion recipe:

$CF_2=CFCl$ _____ gm__ 41.2
2.5 wgt. percent aqueous solution of $K_2S_2O_8$ __ml__ 40.0
4.0 wgt. percent aqueous solution of
 $Cl(CF_2CFCl)_3CF_2COOH$ alkalized to pH 9–10
 with KOH _____ ml__ 46.8
5.25 wgt. percent aqueous solution of
 $Na_2HPO_4 \cdot 7H_2O$ _____ ml__ 38.2

At the completion of the 20 hours the sealed tubes were vented and the polymer coagulated by rapid cooling in Dry Ice. The coagulate was then filtered on a Büchner filter and washed with hot water until free from soap bubbles, after which the washed coagulate was vacuum dried over night at 70° C. and about 100 mm. Hg pressure. Trifluorochloroethylene polymer was produced in a 60% yield with a dilute solution viscosity of about 1.3 cs. (0.75 wgt. percent solution in dichlorobenzotrifluoride at 266° F.).

The above experiment was repeated with the addition of 4.2 grams of $CS_2$ to the emulsion recipe. The resulting trifluorochloroethylene polymer had a ZST (zero strength time) of about 150 seconds and a dilute solution viscosity (0.75% solution in dichlorobenzotrifluoride at 266° F.) of about 0.90 cs. A yield of 95% was produced, indicating the effect of carbon disulfide addition to the polymerization recipe. No sulfur could be detected in the polymer by the usual bomb combustion-barium sulfate analysis.

EXAMPLE 2

Five recipes as shown in Table I were sealed in glass ampules and shaken at 25° C. for 7 hours. After venting the ampules each polymer sample was coagulated by rapid cooling in a Dry Ice-actone bath and filtered with a sintered Büchner filter, the filtrates being collected for further testing. Each coagulate or precipitated polymer was wetted with 50-75 cc. of methanol, and 100-300 cc. of distilled water was added, after which the liquid was drawn through the coagulate by suction. This washing procedure was repeated nine times. A final wash with methanol completed the wash operation. The precipitates were vacuum oven dried in glass dishes at 70° C. and about 100 mm. Hg pressure over a period of 24 hours and then weighed. Test results on the original filtrate and yield data appear in Table II.

*Table I*

| Run No. | $CS_2$, gm. | $CF_2$=CFCl, gm. | 2.5 weight percent aqueous solution,[a] ml. | 4.0 weight percent aqueous solution,[b] ml. | 5.25 weight percent aqueous solution,[c] ml. |
|---|---|---|---|---|---|
| A | | 41.2 | 40 | 46.8 | 38.2 |
| B | 4.2 | 41.2 | 40 | 46.8 | 38.2 |
| C | 8.4 | 41.2 | 40 | 46.8 | 38.2 |
| D | 4.2 | 41.2 | 40 | [d] 46.8 | 38.2 |
| E | | 41.2 | 40 | [d] 46.8 | 38.2 |

[a] $K_2S_2O_8$. [b] $Cl(CF_2CFCl)_3CF_2COOH$ alkalized with KOH to pH 9-10. [c] $Na_2HPO_4.7H_2O$. [d] $H_2O$.

*Table II*

| Run No. | Polymer yield | | Polymer properties | | Final polymer latex properties | | |
|---|---|---|---|---|---|---|---|
| | Gm. | Percent | Dilute solution viscosity, centistokes[1] | NST, °C.[2] | $S_2O_8^{-2}$ titer, ml.[3] | Surface tension, dynes/cm[2] | pH |
| A | 10.5 | 25.5 | 1.222 | 304 | 2.5 | 39.0 | 1.55 |
| B | 16.2 | 39.3 | 1.034 | 287 | 2.5 | 38.7 | 1.55 |
| C | 17.7 | 43.0 | 0.965 | 277 | 2.5 | 38.6 | 1.55 |
| D | 0.49 | 1.2 | | | | | |
| E | 0.54 | 1.3 | | | | | |

[1] 0.75 weight percent solution in dichlorobenzotrifluoride at 266° F.
[2] No strength temperature.
[3] Ml 0.1 N thiosulfate to equivalence for 5 ml. aliquot.

Surface tension was determined on the Du Nuoy tensiometer, the pH by using a Beckman pH meter with a glass reference electrode, and the final $S_2O_8^{-2}$ concentration by adding excess KI to a 5.0 mol aliquot and titrating with 0.1 N thiosulfate solution to the starch-iodide equivalence point.

From the results obtained in the above runs it was concluded that the addition of $CS_2$ causes no detectable change in pH, surface tension, or $S_2O_8^{-2}$ concentration in the filtrate. However, the yields of B and C, which contain $CS_2$, were 54% and 69% higher than A, which contained no $CS_2$.

An eight gram sample of polymer from each of runs A, B, and C was cold pressed at 5,000 p.s.i., then at 220-230° C. and 5,000 p.s.i. and quenched. Clear, bubble free sheets resulted, the samples from each of the runs being indistinguishable in transparency, appearance, and flexibility.

Samples D and E were polymerized without the use of a fluorinated acid salt. Sample D contained $CS_2$, while sample E contained no $CS_2$. The percent yields, both with and without $CS_2$, are low in the absence of the fluorinated acid salt.

EXAMPLE 3

Four samples as shown in Table III were sealed in glass ampules and shaken at 25° C. for 7 hours.

After venting the ampules each polymer sample was coagulated by freezing in a Dry Ice-acetone bath, filtered and dried, as in Example 2. The results of the polymerization appear in Table IV.

*Table III*

| Run No. | NaOCN, gm. | $Na_2CO_3$ | $CS_2$, gm. | $CF_2$=CFCl, gm. | 2.5 weight percent aqueous solution,[a] ml. | 4.0 weight percent aqueous solution,[b] ml. | 5.25 weight percent aqueous solution,[c] ml. |
|---|---|---|---|---|---|---|---|
| A | | | | 41.2 | 40 | 46.8 | 38.2 |
| B | | | 0.4 | 41.2 | 40 | 46.8 | 38.2 |
| C | | 0.4 | 4.2 | 41.2 | 40 | 46.8 | 38.2 |
| D | 0.4 | | 4.2 | 41.2 | 40 | 46.8 | 38.2 |

[a] $K_2S_2O_8$. [b] $Cl(CF_2CFCl)_3CF_2COOH$ alkalized with KOH to pH 9-10. [c] $Na_2HPO_4.7H_2O$.

*Table IV*

| Run No. | Weight polymer | | Dilute solution viscosity, centistokes[1] | pH of final polymer latex |
|---|---|---|---|---|
| | Gm. | Percent | | |
| A | 10.2 | 24.7 | 1.47 | 8.5 |
| B | 10.2 | 24.7 | 1.41 | 8.5 |
| C | 21.8 | 53.0 | 1.10 | 10.5 |
| D | 18.4 | 44.6 | 1.15 | 10.5 |

[1] 0.75 weight percent solution in dichlorobenzotrifluoride at 266° F.

EXAMPLE 4

A polymerization run was carried out in a 3 gallon horizontal autoclave using carbon disulfide in the polymerization recipe. 36 grams of $K_2S_2O_8$ and 72 grams of $Na_2HPO_4.7H_2O$ were each dissolved in 1000 ml. quantities of distilled water. To 9.5 grams of KOH dissolved in 500 ml. of distilled water was added 67.5 gms. of $C_8$ telomer acid, i.e. $Cl(CF_2—CFCl)_3CF_2COOH$, with stirring. The above prepared solutions were then washed into a polyethylene container with 2000 ml. of distilled water and stirred. The resultant solution, having a pH of 8.6, was added to the autoclave along with 150 grams of $CS_2$. $CF_2$=CFCl monomer (1286 gm.) was pressured into autoclave with nitrogen. Polymerization conditions were continued at 22.8-25.5° C. for 24½ hours under autogenous pressure (110-85 p.s.i.g.), after which the polymer latex (1.11 gm./ml., pH—7.65, 18.3% solids) was coagulated by freezing. The coagulate polymer was washed three times by decantation with cold water, three times by decantation with hot water, and finally five times with hot water on a filtering funnel. The filtrate from the last wash was free of $Cl(CF_2CFCl)_3CF_2COOH$, as indicated by its failure to form a precipitate on the addition of a solution of S-benzyl iso-thio-uronium chloride. The recovered polymer, after being dried at 150° C. for 16 hours, weighed 796 grams, corresponding to a 62% conversion and a 72.5% yield after correction for recovered monomer. Final polymer had a dilute solution viscosity (0.75% sol'n dichlorobenzotrifluoride @266° F.) of 1.252 cs. and a ZST (zero strength time) at 260° C. of 317 sec.

When the above run was duplicated (20 hrs. at 23.5-24.5° C.) without carbon disulfide the polymer was realized in a conversion of 44.5%. This polymer had a ZST (260° C.) of 503 sec. and a DSV of 1.523 cs.

EXAMPLE 5

Using the same procedure described in Example 4, a polymerization run was made in the 3 gallon horizontal autoclave using the following emulsion recipe:

| | | |
|---|---|---|
| Distilled water | ml | 4500 |
| $CF_2=CFCl$ | gm | 1433 |
| $CS_2$ | gm | 150 |
| $K_2S_2O_8$ | gm | 36 |
| $Na_2HPO_4 \cdot 7H_2O$ | gm | 72 |
| $C_8$ telomer acid | gm | 67.5 |
| $Na_2CO_3$ | gm | 15.0 |

The pH of the initial combined charge was 9.90. After polymerization for 21½ hours at 75–79° F. and autogenous pressure (120–92 p.s.i.g.), the pH was 7.50 and the polymer latex contained 19–24% solids (1.12 gm./ml.) or 958.7 gms. of polymer. The conversion (based on total monomer) was 67% and the yield was 79.5% (corrected for recovered monomer). The trifluorochloroethylene polymer, after being dried at 150° C. for 48 hours, had a dilute solution viscosity of 1.230 cs. and a ZST at 260° C. of 332 sec.

EXAMPLE 6

The polymerization runs in this group were performed in glass tubes in a tumbling bath at 25° C. The tubes were charged with the $K_2S_2O_8$ solution, telomer acid emulsifying solution, and then $Na_2HPO_4$ solution in that order. After each charge the contents were frozen in a Dry Ice-acetone slurry until the next addition. Finally the $CS_2$ was pipetted into the mixture, and the monomer charge was added.

At the end of 24 hours the tubes were vented and the latex was coagulated by Dry Ice freezing, recovered, washed and dried. Data for these runs is set out in Table V.

Table V

| Run | Gm. $CF_2=CFCl$ | Ml 2.5% $K_2S_2O_8$ sol'n. | Ml 5.25% $Na_2HPO_4 \cdot 7H_2O$ sol'n. | Ml 4.0% $C_8$ telomer acid soln.[1] | Gm. $CS_2$ | Weight polymers, gm. | Percent conversion | DSV c.s.[2] | ZST at 260° C.[3] |
|---|---|---|---|---|---|---|---|---|---|
| A | 41.7 | 40.0 | 38.2 | 46.8 | | 25.57 | 61.4 | 1.389 | 374 |
| B | 41.7 | 40.0 | 38.2 | 46.8 | | 26.16 | 62.6 | 1.409 | 390 |
| C | 41.7 | 40.0 | 38.2 | 46.8 | 4.2 | 35.49 | 85.3 | 1.031 | 231 |
| D | 41.7 | 40.0 | 38.2 | 46.8 | 4.2 | 35.48 | 85.0 | 1,036 | 216 |
| E | 41.7 | 40.0 | 38.2 | 46.8 | 41.7 | 18.05 | 43.0 | 0.786 | 143 |

[1] $C_8$ telomer acid is dissolved in $H_2O$ by heating and adding KOH (pellets and solution) until the pH is 9-10
[2] 0.75% solution is dichlorobenzotrifluoride at 266° F.
[3] ZST of a 260° C. pressing.

It was noted that the addition to the polymerization system of small amounts of $Na_2CO_3$ or NaOCN, usually in quantities of about 0.1 by weight of the weight of carbon disulfide, or less, enhances the yield of polymer, as is indicated by Example 3.

As mentioned earlier, this invention relates to the polymerization of a mono-olefin, particularly a halogenated mono-olefin which is at least half fluorinated and which preferably contains from 2 to 3 carbon atoms, in an aqueous medium containing carbon disulfide and a dispersing agent, preferably an aliphatic fluorocarbon acid or salt.

Various modifications and alterations of the process of this invention will be apparent to those skilled in the art and may be used without departing from the scope of this invention.

We claim:
1. In a process for polymerizing a monomer charge consisting of at least one polymerizable fluorinated monolefin having from 2 to 5 carbon atoms at a temperature between 0° C. and 100° C. in the presence of a polymerization initiator and in an aqueous medium having a pH from 7 to about 14 and having a fluorinated dispersing agent, the improvement which comprises adding carbon disulfide to said aqueous medium in an amount between 1 and 50 parts by weight per 100 parts monomer charge.

2. The process of claim 1 in which the fluorinated dispersing agent is selected from the group consisting of aliphatic fluorohalocarbon acids and the inorganic salts thereof.

3. The process of claim 1 in which said aqueous medium also contains below about 10% by weight, based on said carbon disulfide, of a member of the group consisting of sodium carbonate and sodium cyanate.

4. The process of claim 1 in which said aqueous medium also contains below about 10% by weight, based on said carbon disulfide, of sodium cyanate.

5. The process of claim 1 in which said monomer charge contains chlorotrifluoroethylene.

6. In a process for polymerizing trifluorochloroethylene at a temperature between 0° C. and 100° C. in the presence of a polymerization initiator and in an aqueous medium containing a dispersing agent selected from the group consisting of aliphatic perfluorochloro acids and the inorganic salts thereof, the improvement which comprises adding carbon disulfide to said aqueous medium in an amount between 1 and 50 parts by weight per 100 parts of trifluorochloroethylene and adding small amounts, relative to the amount of said carbon disulfide, of a member of the group consisting of sodium carbonate and sodium cyanate, at a pH of from about 8 to about 11.

7. The process of claim 6 in which the member of the group consisting of sodium carbonate and sodium cyanate is added in an amount of about 10 weight percent and less of the weight of carbon disulfide.

References Cited in the file of this patent
UNITED STATES PATENTS

| | | |
|---|---|---|
| 2,393,157 | Gleason | Jan. 15, 1946 |
| 2,559,752 | Berry | July 10, 1951 |
| 2,640,821 | Pritchard et al. | June 2, 1953 |
| 2,682,530 | St. John | June 29, 1954 |
| 2,874,152 | Bolstad | Feb. 17, 1959 |
| 2,898,196 | Buffington | Mar. 17, 1959 |